Figure 3:
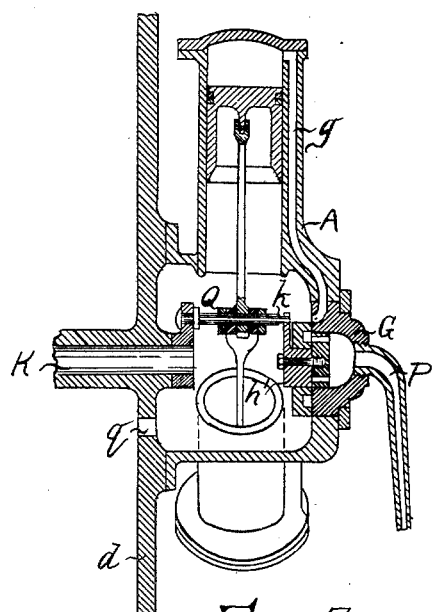

No. 675,564. Patented June 4, 1901.
W. G. KENT & J. GORDON.
APPARATUS FOR INDICATING AND RECORDING SPEED OF ROTATING SHAFTS.
(Application filed Oct. 2, 1900.)
(No Model.) 2 Sheets—Sheet 1.

No. 675,564. Patented June 4, 1901.
W. G. KENT & J. GORDON.
APPARATUS FOR INDICATING AND RECORDING SPEED OF ROTATING SHAFTS.
(Application filed Oct. 2, 1900.)
(No Model.) 2 Sheets—Sheet 2.
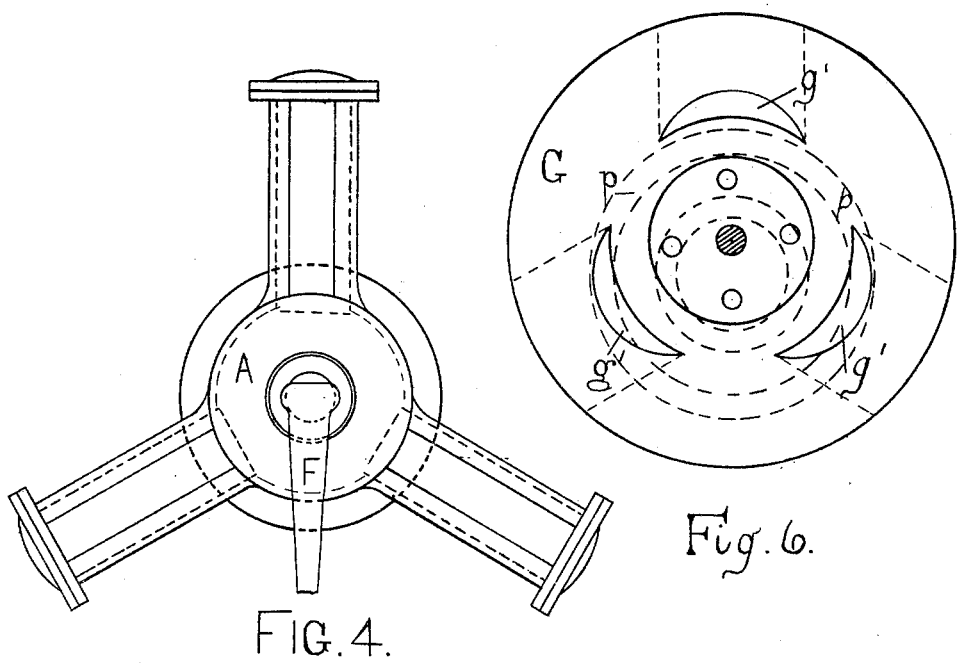
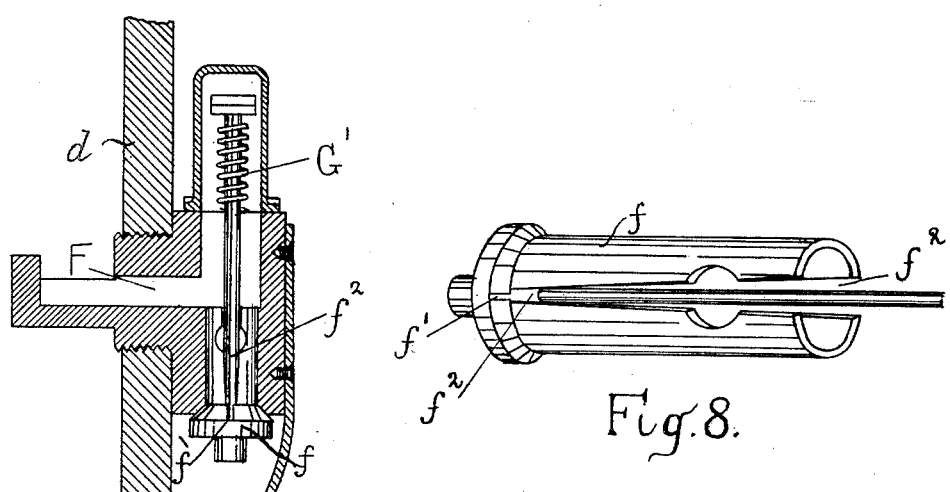
WITNESSES:
INVENTORS.
Walter George Kent
John Gordon
BY
ATTORNEYS

UNITED STATES PATENT OFFICE.

WALTER G. KENT AND JOHN GORDON, OF LONDON, ENGLAND.

APPARATUS FOR INDICATING AND RECORDING SPEED OF ROTATING SHAFTS.

SPECIFICATION forming part of Letters Patent No. 675,564, dated June 4, 1901.

Application filed October 2, 1900. Serial No. 31,758. (No model.)

*To all whom it may concern:*

Be it known that we, WALTER GEORGE KENT and JOHN GORDON, subjects of the Queen of Great Britain and Ireland, residing at London, England, have invented a new and Improved Apparatus for Indicating and Recording Speeds of Rotating Shafts, (for which we have made application for Letters Patent for part thereof in Great Britain under No. 6,137, dated April 2, 1900,) of which the following is a specification.

This invention relates to a gage capable of giving a permanent record of the velocity with which a shaft of an engine or motor, such as that of a steamer, is moving at any time and is characterized by means which adapts the device, first, to give an exaggerated and distinctly visible indication immediately the engine starts; second, to give automatically and without personal attention a prompt and distinct indication of the reversal of the movement of the engines—*i. e.*, when going astern in a steamer; third, to be unaffected by the motion of a vessel within which it may be placed; fourth, to be unaffected by the relative distances of various gages or indicators placed at any reasonable distance above or away from the device; fifth, to give an artificially reduced and compressed scale of intervals and of pressures producing the same for large variations of speed to keep the gage within the mechanical limits of an ordinary pressure-gage, and, sixth, a relief to be afforded to the pressure-gages at a fixed limit of racing speed, the records so obtained in a steamer giving an absolute chart and time record of starts, any variations of speed, stoppages, reversal of engines, and even the condition of weather or disturbances of the sea deducible from the recorded momentary variations of speed in the engines. To effect these various and important results, we use and find it necessary to use, in combination, a liquid-circulating pump, preferably of the multiple-plunger type, adapted so that the stream of liquid therethrough shall be reversed as regards its issue upon reversal of the crank operating such pump; a control-valve between the issue and the suction of such pump adapted to open only in one direction after a certain minimum pressure has been set up in the liquid to automatically vary the area of the affected orifice it gives according to pressure upon the valve to have a constant relief by-pass, and to close upon reversal of the stream except for such small by-pass, a communication by air from the delivery-pressure of such pump to gages or recorders at various points, and a compactness of structure in the pump and liquid-reservoirs.

We are aware that pumps operated by a rotating shaft have been devised and are on record for the purpose of indicating by the pressure of delivery of such pumps either direct from such liquid or from an imprisoned volume of air communicating such pressure for the indication of the speed of such rotating shaft; but the omission to obtain any one or other of the above desiderata has been found to mar the commercial success of such devices, and so far as we are aware a combination of devices adapted to produce the above desiderata is not as yet known.

In order that our invention may be the better understood, we will now proceed to describe the same with reference to the drawings hereto annexed and to the letters inserted thereon.

Figure 2:
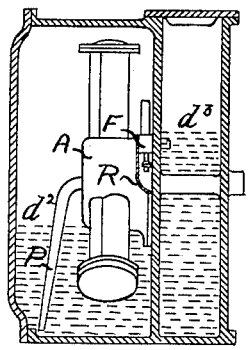
Figure 1:
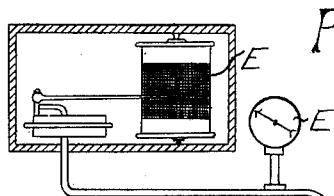
Figure 5:
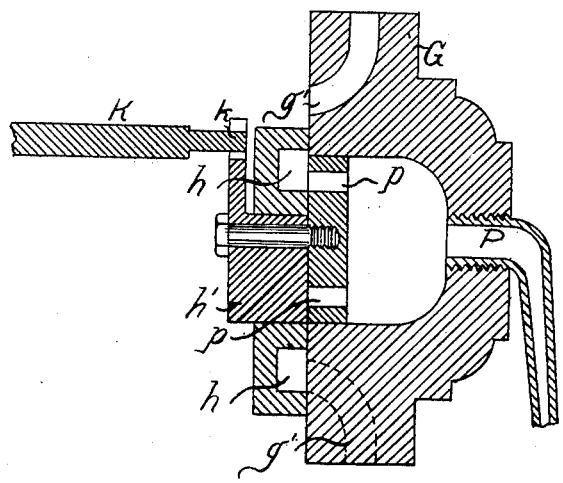

Figure 1 is a diagrammatic representation of the general arrangement of our apparatus. Fig. 2 is a sectional view through the reservoir. Fig. 3 is an enlarged vertical section through the pump. Fig. 4 is a side elevation of the pump. Figs. 5 and 6 are details of the valve and seating used for said pump. Fig. 7 is an enlarged vertical section through the return-orifice of circulation and the control-valve between the discharge and suction of said pump, and Fig. 8 is a perspective view of the valve in said orifice.

To carry out our invention, we employ a triple-cylinder single-acting pump A, such construction being preferred as best adapted for liquid tightness with slow speed of revolution and long life without attention. The said pump is driven through any convenient form of belt-band or chain attachment or gearing B from the rotating shaft C of any steam engine or motor of which the speed of revolution is desired to be indicated or recorded. Such pump is affixed to one side of a central diaphragm $d$ of a double box or reservoir D for liquid, such as oil, and the pump A forms a means of circulation of the liquid or oil from one compartment $d^2$ (which is normally the supply or suction compartment) to the other $d^3$. The compartment $d^3$ of the said box or reservoir, which is the delivery-compartment under normal circumstances, serves as an air-chamber, the upper part of the said compartment and the pipes $e$ (leading to the various gages or recorders E E) being filled with an imprisoned volume of air.

Between the two compartments $d^2$ and $d^3$ is a communication nozzle or short pipe F, Figs. 2, 7, and 8, which is fitted with a control-valve $f$, held up against the normal direction of discharge from $d^3$ to $d^2$ by a spring G'. This valve $f$ fills the neck of its seating by its tubular body, except for a small "weep" around the same, and preferably through a niche or groove $f'$ in the hand of the valve; but such weep may be provided by any small by-pass, which allows any difference of pressure in the two compartments to cause the liquid or oil to weep through until equilibrium is restored. The tubular body of the valve is cut with one or more longitudinal slots $f^2$ up to the head, such slots being made of variable width as may be desired, but tending to increase in area from the head to the tail of the valve.

When the pump is at rest, the valve $f$ is on its seating. Upon the starting of the pump with discharge into the compartment $d^3$ the pressure therein is immediately raised by the compression of the air therein, giving an immediate record of starting upon the gages or recorder. The valve $f$ is then gradually raised from its seating, uncovering the expanding slots $f^2$, thereby increasing the effective area of the valve as pressure increases in the chamber $d^3$, and thus reducing the rise of pressure for increase of speed of the pump A, which rise would otherwise be as the square of the speed, and increase in too rapid increments. At the same time should an exceptionally large scale be required at certain intervals of speeds by a reduction of the area of the slot between such points the scale may be magnified. As a precaution against excessive pressure in the gages beyond working limits—that is, when the engines are racing—a large sudden increase in the area of the slot or slots $f^2$ may be made at the limit of practical observation. Thus an immediate and exaggerated indication and record of the starting of the engine, even at the slowest speed, may be obtained upon the dial of any suitable pressure-gage, such as a Bourdon or aneroid, and this indication may be made a matter of record by the known revolving and recording cylinder, marked by a pencil from the said pressure-gage, all of which being well-known devices need not be further described in detail.

In order that an immediate and marked indication by vacuum may be automatically obtained on the said gages and recorders by our apparatus, we operate the opening and closing of the suction and discharge of the pump mechanically from the pump-driving shaft, so that upon reversal of the direction of the pump-shaft the direction of discharge from one chamber, $d^2$, to the other, $d^3$, will be reversed, and as our control-valve $f$, before described, situated in the communication-pipe between the chambers, immediately closes, except for the aforsaid small weep through the valve, a partial vacuum is at once set up in the aforesaid discharge or air chamber $d^3$, when the oil is withdrawn therefrom and delivered into the almost-closed chamber $d^2$, which was normally the supply or suction chamber. To carry this out, we bring the three supply-ports $g$, Fig. 3, of the respective pump-cylinders to a central valve face or block G, having apertures $g'$ therein of peculiar crescent shape, corresponding to the said cylinder-ports, and to this valve-face we fit a disk valve H, having a circular pocket $h$ on its under face toward the ports. In the center of the valve-face G are also a series of apertures $p$ from the suction or supply pipe P, carried into the supply-chamber $d^2$. The said disk valve H is mounted upon an eccentric $h'$, which is caused to revolve on a spindle (footed into the valve-face G) by a small return crank-arm $k$ from the pump crank-shaft K. The disk valve thus makes both a rotary and a traversing movement about the valve-face G, uniting in succession the cylinder-port apertures $g'$ with the central suction-supply P, while at the same time the port-apertures $g'$ are exposed in succession beyond the rim of the disk valve H for discharge into the crank-chamber Q, which communicates with the discharge or pressure chamber $d^3$ by the apertures $q\ q$ in the diaphragm. The discharge into the chamber $d^2$ from the return-valve F is carried by a glide or trough R, adapted to prevent frothing of the oil as far as possible. This disk valve so operated thus serves to control the suction to and discharge from all the pump-cylinders, and by its combined rotary and translating movement cannot score or groove the valve-face, but must wear uniformly thereover. Further, as the pocket $h$ in the said valve is a perfect annulus the valve is not fixed tightly on its driving eccentric tumbler, but may shift its position on the eccentric without interference with its function. It is kept upon its face by the external pressure of discharge in the pressure-chamber $d^3$. It will be noticed also that upon reversal of the direction of rotation of the pump crank-shaft the direction of flow of the pumped oil is reversed, the discharge-apertures $g'$ becoming the suction-apertures and the discharge being through the suction-ports into the original suction or supply chamber $d^2$, thus giving automatically an immediate partial vacuum in the former pressure-chamber $d^3$, and thus to the gages.

By the compact arrangement of the pump A within its own divided suction and pressure reservoir and by the fact that all fluid-pressure is communicated by air the whole apparatus is unaffected as regards irregularity of liquid-pressure by the movement or pitching or tossing of a vessel or other structure to which it may be applied.

Having now described this invention, what we claim, and desire to secure by Letters Patent, is—

1. A rotating-shaft speed-indicator, consisting of, in combination, a pump circulating a liquid between two compartments; connections between said shaft and pump to produce isochronous rotation; a mechanically-moved pump-valve, determining reversal of flow of liquid between said compartments for reversal of pump-shaft; a communication between said compartments to complete circulation; an automatic control-valve in said communication, spring-loaded against normal flow, adapted to close on reversal of flow through said communication; a small by-pass around said valve and an imprisoned air volume in discharge-chamber, and in pipe communications, to known gages and recorders.

2. In a rotating-shaft speed-indicator, in combination, a divided oil or liquid reservoir; a reciprocating pump having three single-acting cylinders, fixed in one compartment of said reservoir; a suction admission to central valve-face from the said compartment of said reservoir; a disk valve on said valve-face, having an annular pocket on under face, apertures from each cylinder-port on said valve-face communicating with discharge-compartment; an eccentric embedded in center of said disk valve; connections from pump-crank to revolve said central eccentric, to give a rotary and translating movement of said valve over said valve-face; a communication between parts of said divided reservoir having a spring-pressed control-valve, closing, except for small weep, on reversal of circulation; and an imprisoned air volume in one part of said reservoir communicating with pressure-gages.

3. In a rotating-shaft speed-indicator, in combination, a divided oil or liquid reservoir; a reciprocating pump in one compartment thereof; ports through said pump controlled by a mechanically-moved valve to effect displacement of oil or liquid from one compartment to the other; a further communication between compartments to complete circulation; a spring-pressed control-valve in said communication; a slight by-pass through or around said valve; longitudinal slots through tubular body of said valve of variable width; and an imprisoned air volume in one part of said reservoir communicating with pressure-gages.

4. In a rotating speed-shaft indicator, in combination; a divided oil or liquid reservoir; a pump in one compartment adapted to displace oil or liquid from one compartment to the other and to reverse displacement upon reversal of driving-shaft; a further communication between compartments to complete circulation; a spring-pressed control-valve in said communication adapted to give variable area of issue, and to close on reversal of stream, a slight by-pass through or around said valve; and an imprisoned air volume in part of said reservoir communicating with pressure-gages.

5. In combination; single-acting pump-barrels, distributed about a crank-shaft; ports from said pump-barrels to a central valve-face; a central exit port or ports in center of said valve-face; an annular inverted trough-valve over said ports; a spindle in center of said valve-face; and an eccentric turning on said spindle, within the body of said annular valve to determine control of issue and inlet ports of said pump according to the direction of rotation of the driving crank-shaft.

In witness whereof we have hereunto set our hands in presence of two witnesses.

WALTER G. KENT.
JOHN GORDON.

Witnesses:
  JOHN C. FELL,
  RICHARD A. HOFFMANN.